United States Patent
Yang

(10) Patent No.: US 10,029,337 B2
(45) Date of Patent: Jul. 24, 2018

(54) METHOD OF MANUFACTURING HEAT DISSIPATION DEVICE

(71) Applicant: ASIA VITAL COMPONENTS CO., LTD., New Taipei (TW)

(72) Inventor: Hsiu-Wei Yang, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 316 days.

(21) Appl. No.: 14/676,827

(22) Filed: Apr. 2, 2015

(65) Prior Publication Data
US 2016/0288277 A1    Oct. 6, 2016

(51) Int. Cl.
*B23P 15/26*    (2006.01)
*F28D 15/04*    (2006.01)
*F28D 15/02*    (2006.01)

(52) U.S. Cl.
CPC .......... *B23P 15/26* (2013.01); *F28D 15/0233* (2013.01); *F28D 15/046* (2013.01); *B23P 2700/09* (2013.01)

(58) Field of Classification Search
CPC .. F28D 15/02; F28D 15/0233; F28D 15/0275; F28D 15/04; B23P 15/26; B23P 2700/10; B23P 2700/09; B23K 11/11; B23K 11/115; B23K 15/0006; B23K 15/008; B23K 1/06
USPC ....................... 29/890.032, 890.039, 890.054
See application file for complete search history.

(56) References Cited

U.S. PATENT DOCUMENTS

| | | | | |
|---|---|---|---|---|
| 2,064,141 | A | * 12/1936 | Askin | B21D 53/04 165/133 |
| 3,613,778 | A | * 10/1971 | Feldman, Jr. | B64G 1/506 165/104.26 |
| 4,046,190 | A | * 9/1977 | Marcus | F28D 15/0233 165/104.26 |
| 6,374,905 | B1 | * 4/2002 | Tantoush | H01L 23/367 165/104.33 |
| 6,408,934 | B1 | * 6/2002 | Ishida | F28D 15/0233 165/104.33 |
| 7,430,804 | B2 | * 10/2008 | Hou | B23P 15/26 165/104.18 |
| 7,467,466 | B2 | * 12/2008 | Hou | B23P 15/26 165/104.18 |
| 8,365,408 | B2 | * 2/2013 | Seo | B23K 20/122 165/169 |

(Continued)

FOREIGN PATENT DOCUMENTS

| | | |
|---|---|---|
| CN | 101084408 A | 12/2007 |
| TW | M469525 U | 1/2014 |
| TW | M497420 U | 3/2015 |

*Primary Examiner* — Jason L Vaughan
*Assistant Examiner* — Amanda Meneghini
(74) *Attorney, Agent, or Firm* — C. G. Mersereau; Nikolai & Mersereau, P.A.

(57) ABSTRACT

A method of manufacturing heat dissipation device includes the steps of providing at least one heat transfer unit; further providing at least one frame for connecting to the at least one heat transfer unit; and spot welding the heat transfer unit to the frame at a junction formed therebetween, so that the heat transfer unit is fixedly attached to the frame. With the above method, the steps for assembling the heat transfer unit to the frame are effectively reduced, and the material and production costs for applying adhesive agent or adhesive tape are also saved.

8 Claims, 13 Drawing Sheets

(56) References Cited

U.S. PATENT DOCUMENTS

2005/0029233 A1* 2/2005 Schuhen ............... B23K 11/115
219/86.22
2007/0175867 A1* 8/2007 Wang ................... B23K 11/004
219/86.9

* cited by examiner

METHOD OF MANUFACTURING HEAT DISSIPATION DEVICE

FIELD OF THE INVENTION

The present invention relates to a heat dissipation device, and more specifically, to a method of manufacturing heat dissipation device that enables a heat dissipation device to be manufactured with fewer steps and at largely reduced manufacturing cost.

BACKGROUND OF THE INVENTION

As the advancement of the mobile technology, users' demand for thin, light and high-performance hand-held mobile devices, such as cell phones, tablet PCs, Personal Digital Assistants (PDAs) and so on, has also largely increased. These thin, light and high-performance hand-held mobile devices have limited internal space while their internal electronic elements, such as the Central Processing Unit (CPU), the integrated circuits and the like, produce a large amount of heat during operation at a high speed. For the hand-held mobile devices to maintain normal operation and have prolonged service life, it is foremost to effectively dissipate the heat produced by the internal electronic elements out of the limited internal space of the hand-held mobile devices.

The currently available hand-held mobile device with heat dissipation structure includes a case, a frame, a heat generating element, and a heat transfer element made of a metal or a composite material. The heat generating element, such as the Central Processing Unit (CPU), the integrated circuit, or other electronic element, is located in a receiving space defined in the case and attached to the frame. The heat transfer element can be connected to the frame in two ways. In the first way, the heat transfer element is fixedly connected to the frame using an adhesive agent, such as epoxy, or an adhesive tape. However, an additional cost for applying the adhesive agent or the adhesive tape is required.

In the second way, the heat transfer element is fixedly connected to the frame by soldering. Generally, soldering is a process in which at least two metal items are joined together by melting and flowing solder, usually tin-based alloy, into a junction between the two metal items. In the process of soldering, it is not necessary to melt the metal items. However, the areas of the metal items to be connected together must be heated in the process. In other words, the solder is melted and flows into the junction formed between the heat transfer element and the frame to connect and mount the heat transfer element to the frame. In the process of soldering, the heat transfer element and the frame are subjected to high temperature and tend to shift relative to each other in their positions, and the solder located between the heat transfer element and the frame also results in increased accumulated tolerance between the heat transfer element, the frame and the heat generating element, causing difficulty in the subsequent assembling process.

A prior thin heat dissipation device is disclosed and including a heat transfer plate and a heat pipe. The heat transfer plate internally defines a hallow groove, in which a C-shaped curved inner wall surface is formed. The heat pipe is tightly press-fitted into the hallow groove and clamped in the C-shaped curved inner wall surface. The inner wall surface of the heat transfer plate must be processed first to become C-shaped. Then, the heat pipe is flattened out and tightly press-fitted into the hallow groove, so that the heat pipe can be tightly fitted in the hallow groove and clamped in the C-shaped curved inner wall surface. Therefore, the manufacturing cost of the thin heat dissipation device is increased, and only a heat pipe can be used as a heat transfer member thereof. This type of heat dissipation device is inconvenient and impractical for use because it could not be used with a non-C-shaped heat transfer member or a non-deformable heat transfer member.

It is therefore tried by the inventor to develop an improved method for manufacturing heat dissipation device, so as to overcome the above problems.

SUMMARY OF THE INVENTION

To solve the above problems, a primary object of the present invention is to provide a method of manufacturing heat dissipation device that enables a heat dissipation device to be manufactured with fewer steps and at largely reduced manufacturing cost.

Another object of the present invention is to provide a method of manufacturing heat dissipation device that allows a heat dissipation device to have enhanced compatibility with a heat transfer unit.

A further object of the present invention is to provide a method of manufacturing heat dissipation device that can avoid the problem of assembling tolerance in a heat dissipation device.

To achieve the above and other objects, the method of manufacturing heat dissipation device provided according to the present invention includes the steps of providing at least one heat transfer unit, which internally defines a chamber having at least one wick structure and a working fluid provided therein; further providing a frame for connecting to the heat transfer unit; and spot welding the heat transfer unit to the frame at a junction formed therebetween, so that the heat transfer unit is fixedly attached to the frame. With the above method, the steps for assembling the heat transfer unit to the frame are effectively reduced, the material and production costs for applying adhesive agent or adhesive tape are saved, and the problem of assembling tolerance caused by accumulated solder can be avoided.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
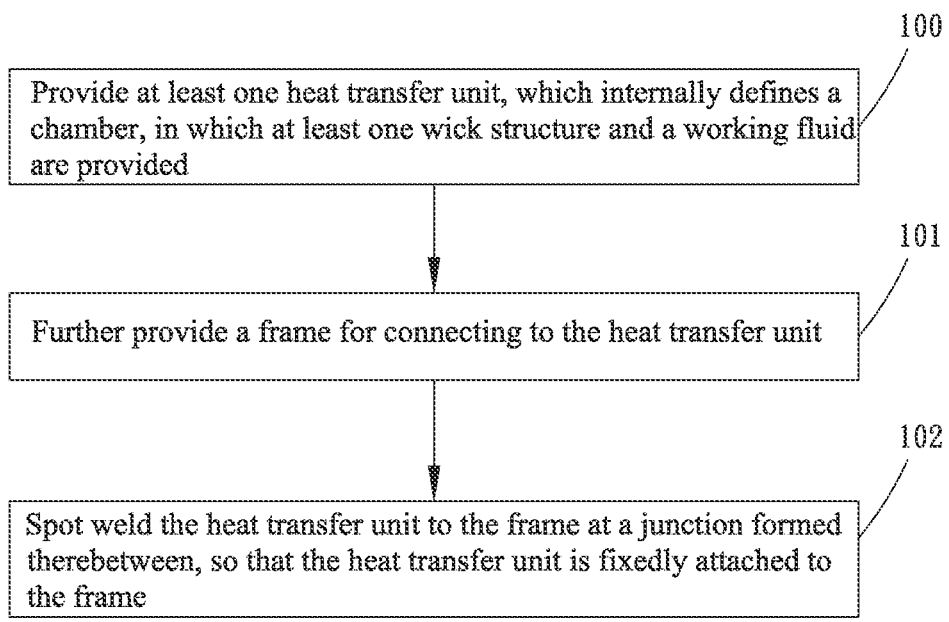
FIG. 1 is a flowchart showing the steps included in a first embodiment of a method of manufacturing heat dissipation device according to the present invention.

The present invention will now be described with some preferred embodiments thereof and by referring to the accompanying drawings. For the purpose of easy to understand, elements that are the same in the preferred embodiments are denoted by the same reference numerals.

Figure 2A:
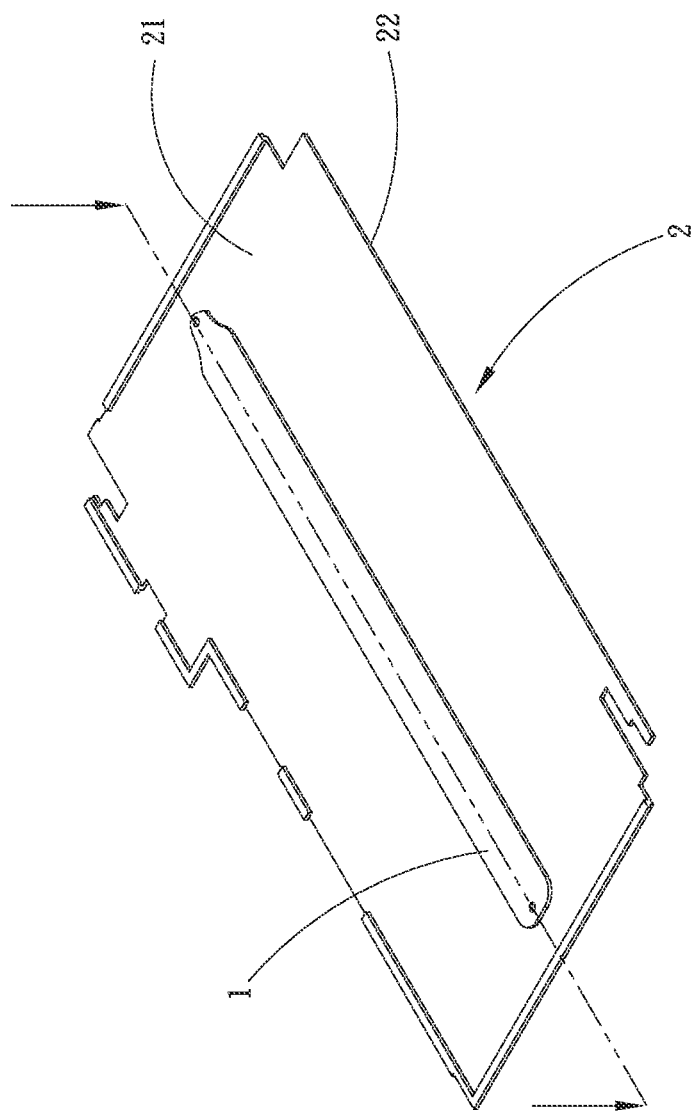
FIG. 2A is an assembled perspective view showing the first embodiment of the manufacturing method according to the present invention.
Figure 2B:
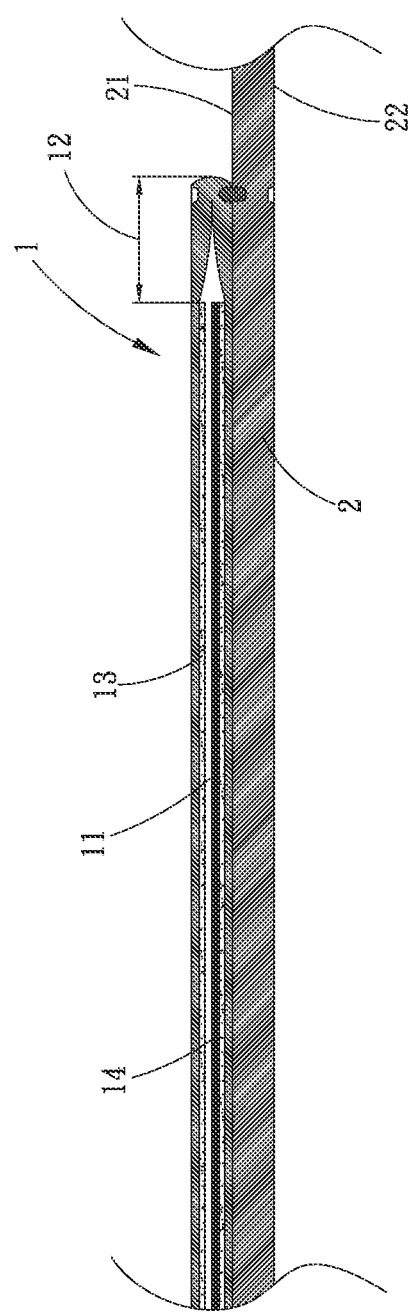
FIG. 2B is a fragmentary assembled sectional view of FIG. 2A.

Please refer to FIGS. 1, 2A and 2B, wherein FIG. 1 is a flowchart showing the steps 100, 101, and 102 included in a first embodiment of a method of manufacturing heat dissipation device according to the present invention, and FIGS. 2A and 2B are assembled perspective and sectional views, respectively, showing the first embodiment of the manufacturing method according to the present invention. For the purpose of conciseness, the present invention is also briefly referred to as the manufacturing method herein.

In the step 100, at least one heat transfer unit is provided. The heat transfer unit 1 internally defines a chamber, in which at least one wick structure and a working fluid are provided.

More specifically, according to the first embodiment, in the step 100, a heat transfer unit 1 in the form of a flat heat pipe is provided. The heat transfer unit 1 internally defines a chamber 11, in which at least one wick structure 13 and a working fluid 14 are provided. Two ends of the heat transfer unit 1 are respectively provided with an ineffective portion 12 for sealing the chamber 11. The wick structure 13 can be, for example but not limited to, a sintered powder structure in the illustrated first embodiment. In practical implementation, the wick structure 13 can also be grooves, metal meshes, or fiber meshes. The chamber 11 is filled with the working fluid 14, which can be pure water, an inorganic compound, alcohols, ketones, a liquid metal, a refrigerant or an organic compound. The ineffective portions 12 are respectively defined between the wick structure 13 provided in the chamber 11 and one of two closed ends of the heat transfer unit 1, and the ineffective portions 12 are not provided with any wick structure therein to facilitate easy filling of the working fluid 14 into the chamber 11 via the ineffective portions 12. Therefore, the ineffective portions 12 of the heat transfer unit 1 do not function to transfer heat.

In the step 101, at least one frame is further provided for connecting to the heat transfer unit.

More specifically, according to the first embodiment, in the step 101, a frame 2 is further provided. The frame 2 is made of an electromagnetic interference prevention material, such as a metal material, and has a first side 21 and a second side 22 opposite to the first side 21. The first side 21 of the frame 2 is flat in the illustrated first embodiment, and the heat transfer unit 1 is located on and attached to the first side 21 of the frame 2.

In the step 102, the heat transfer unit is spot welded to the frame at a junction formed therebetween, so that the heat transfer unit is fixedly attached to the frame.

More specifically, in the step 102, after the heat transfer unit 1 in the form of a flat heat pipe is attached to the first side 21 of the frame 2, at least one junction is formed between the heat transfer unit 1 and the first side 21 of the frame 2. Then, the heat transfer unit 1 is spot welded to the frame 2 at the junction. The spot welding can be resistance welding, ultrasonic welding, or laser spot welding. It is noted the heat transfer unit 1 is fixedly attached to the frame 2 by spot welding the ineffective portions 12 located at two ends of the heat transfer unit 1 to the frame 2. With the above method, the heat transfer unit 1 is fixedly attached to the frame 2 by spot welding, which not only effectively reduces the steps for assembling the heat transfer unit 1 to the frame 2 and the material and production costs for applying adhesive agent or adhesive tape, but also avoids the problem of assembling tolerance caused by accumulated solder.

Figure 3A:
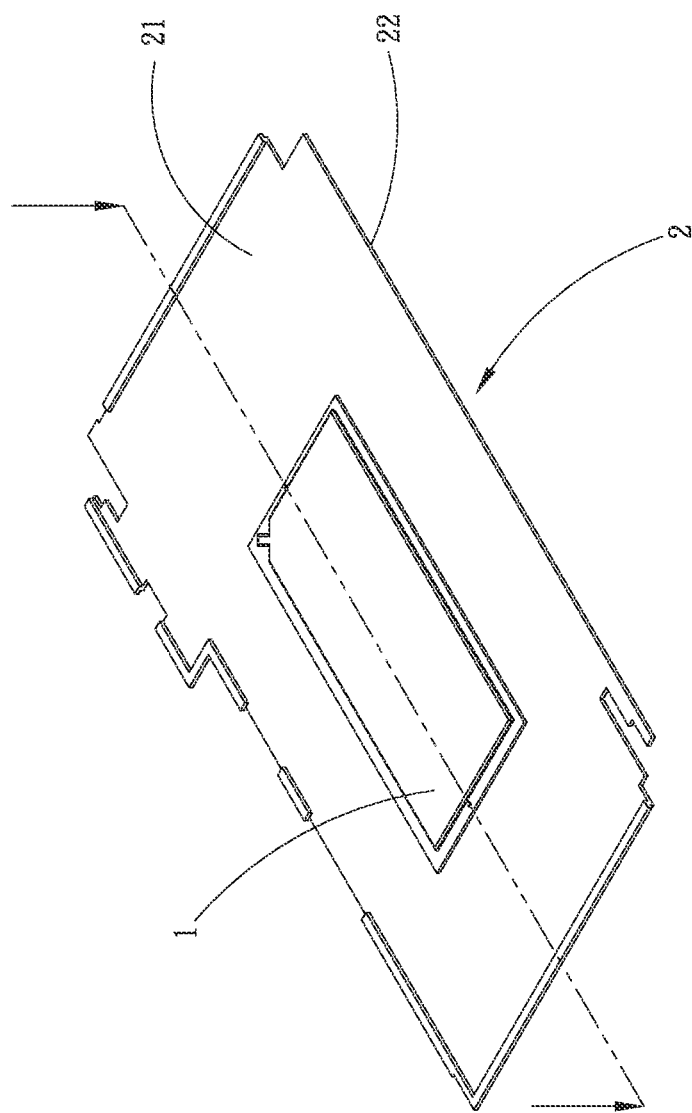
FIG. 3A is an assembled perspective view showing a second embodiment of the manufacturing method according to the present invention.
Figure 3B:
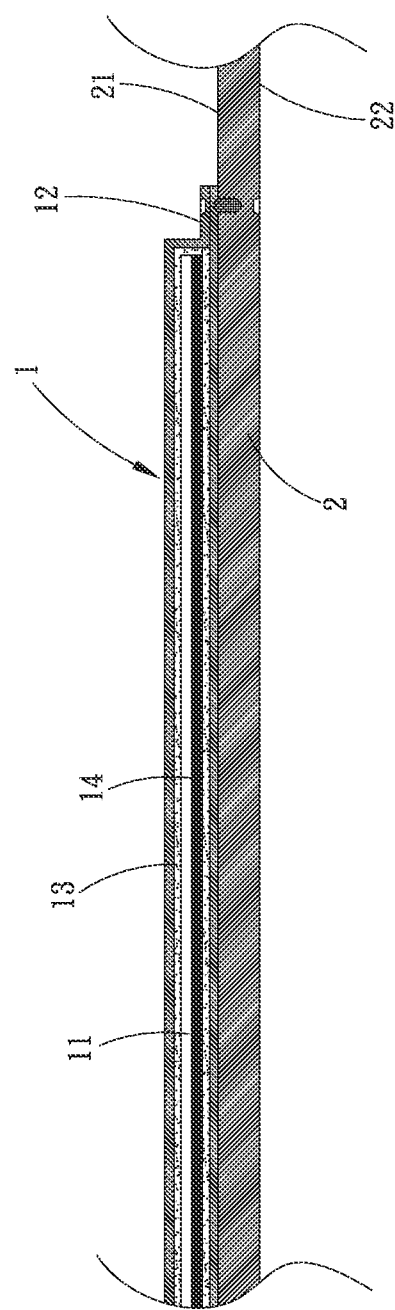
FIG. 3B is a fragmentary assembled sectional view of FIG. 3A.

Please refer to FIGS. 3A and 3B, which are assembled perspective and sectional views, respectively, showing a second embodiment of the manufacturing method according to the present invention. The second embodiment of the manufacturing method is generally similar to the first embodiment except that, in the second embodiment, the heat transfer unit 1 is in the form of a plate-type heat pipe or a vapor chamber, and the plate-type heat pipe has sealed outer peripheral edges that form the ineffective portions 12. In practical implementation, after the heat transfer unit 1 in the form of a plate-type heat pipe is attached to the first side 21 of the frame 2, a junction is formed between the heat transfer unit 1 and the first side 21 of the frame 2. Then, the heat transfer unit 1 is spot welded to the frame 2 at the junction. The spot welding can be resistance welding, ultrasonic welding, or laser spot welding. It is noted the heat transfer unit 1 is fixedly attached to the frame 2 by spot welding the ineffective portions 12 located at the outer peripheral edges of the heat transfer unit 1 to the frame 2. With the above method, the heat transfer unit 1 is fixedly attached to the frame 2 by spot welding, which not only effectively reduces the steps for assembling the heat transfer unit 1 to the frame 2 and the material and production costs for applying adhesive agent or adhesive tape, but also avoids the problem of assembling tolerance caused by accumulated solder.

Figure 4A:
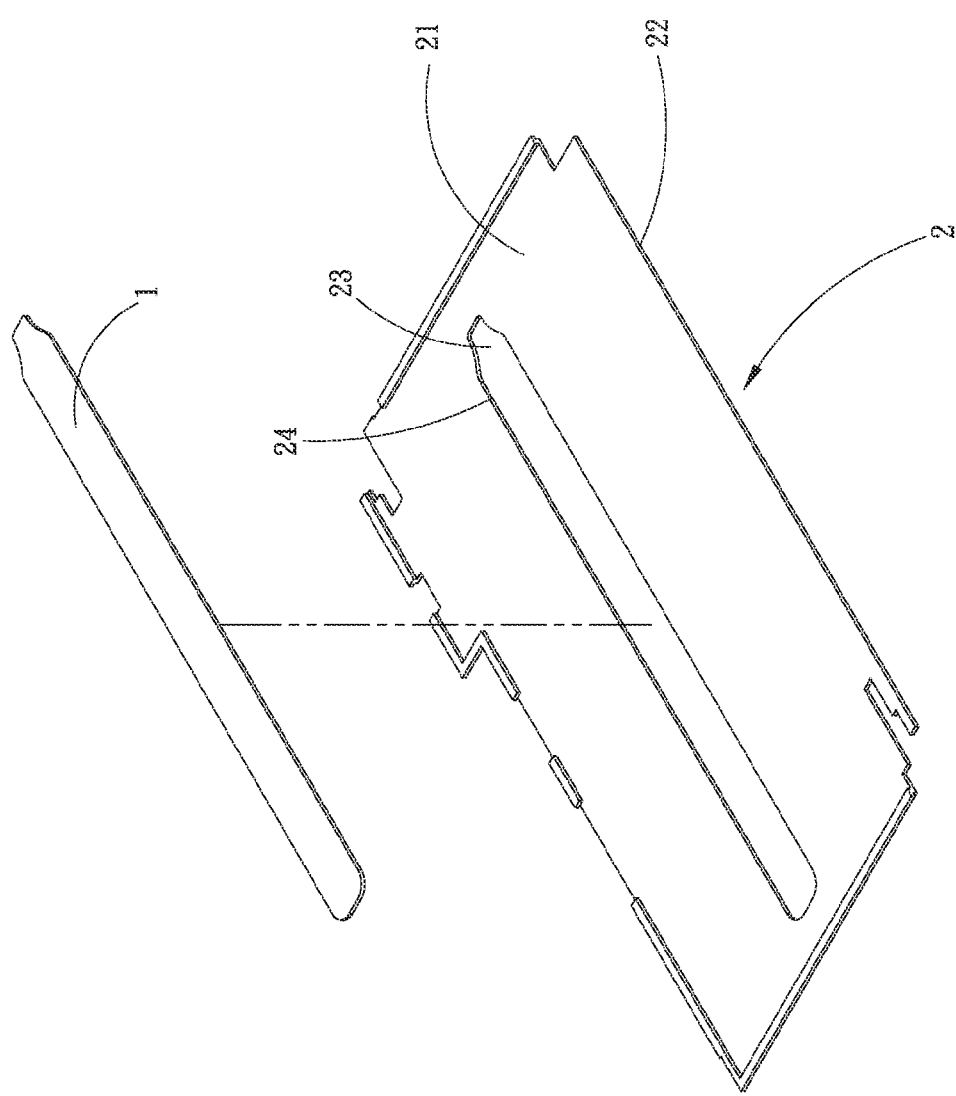
FIG. 4A is an exploded perspective view showing a third embodiment of the manufacturing method according to the present invention.
Figure 4B:
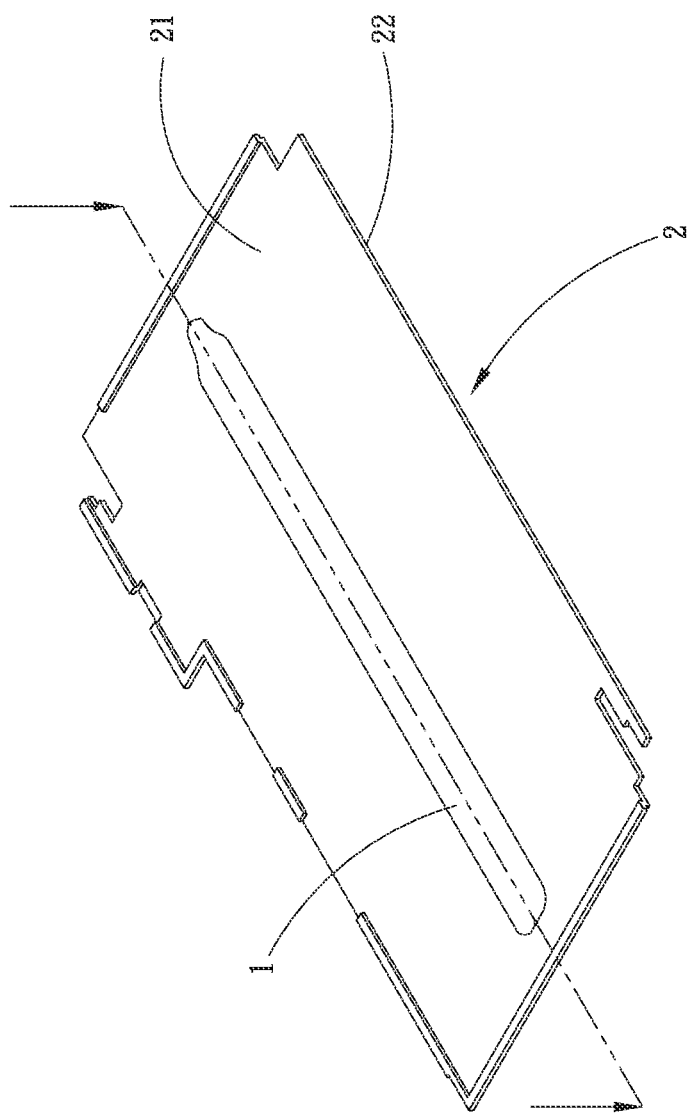
FIG. 4B is an assembled perspective view of FIG. 4A.
Figure 4C:
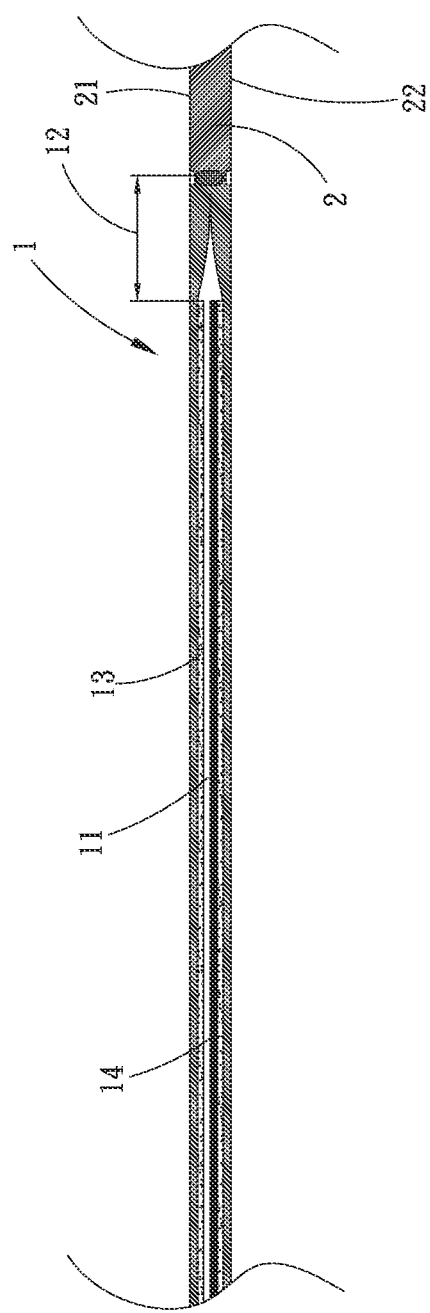
FIG. 4C is a fragmentary assembled sectional view of FIG. 4A.

Please refer to FIGS. 4A, 4B, and 4C, which are exploded perspective, assembled perspective, and assembled sectional views, respectively, showing a third embodiment of the manufacturing method according to the present invention. The third embodiment of the manufacturing method is generally similar to the first preferred embodiment except that, in the third embodiment, the frame 2 further has a receiving space 23 defined thereon for receiving the heat transfer unit 1 therein. The receiving space 23 is extended through the frame 2 from the first side 21 to the second side 22. The receiving space 23 has an inner wall surface 24 perpendicular to the top and the second side 21, 22 of the frame 2. The heat transfer unit 1 is fitted in the receiving space 23, and then the heat transfer unit 1 and the frame 2 are spot welded together at a junction formed therebetween, so as to hold the heat transfer unit 1 in the receiving space 23 on the frame 2. The spot welding can be resistance welding, ultrasonic welding, or laser spot welding. It is noted the heat transfer unit 1 is fixedly attached to the frame 2 by spot welding the ineffective portions 12 located at two ends of the heat transfer unit 1 to the frame 2. With the above method, the heat transfer unit 1 is fixedly attached to the frame 2 by spot welding, which not only effectively reduces the steps for assembling the heat transfer unit 1 to the frame 2 and the material and production costs for applying adhesive agent or adhesive tape, but also avoids the problem of assembling tolerance caused by accumulated solder.

Figure 5A:
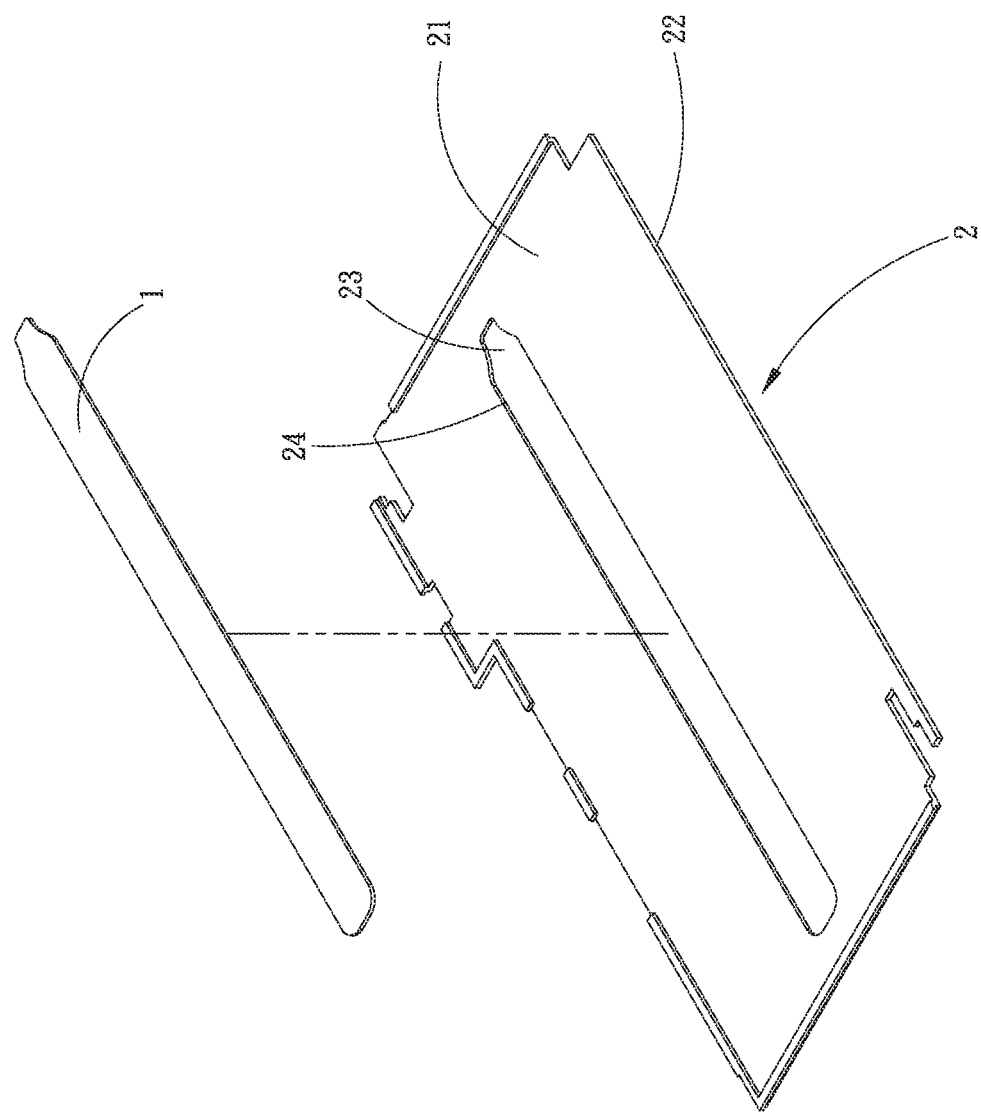
FIG. 5A is an exploded perspective view showing a fourth embodiment of the manufacturing method according to the present invention.
Figure 5B:
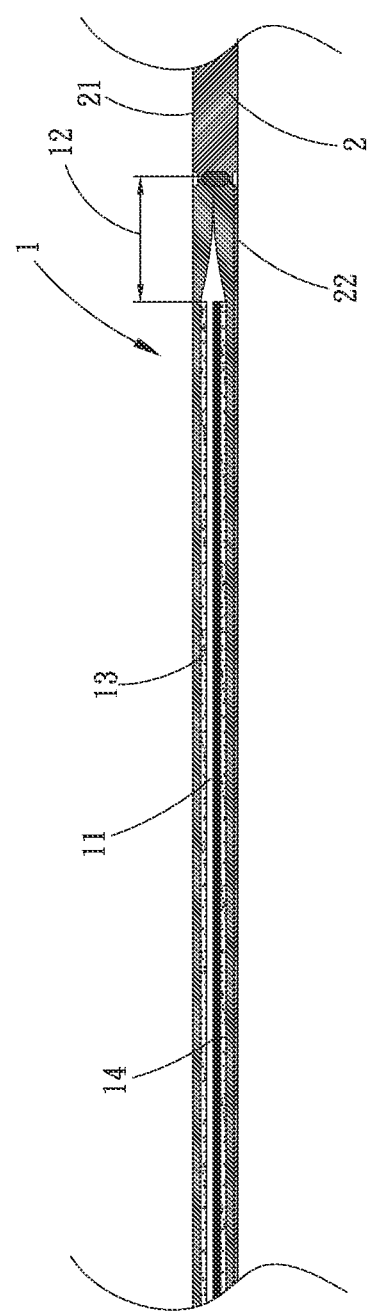
FIG. 5B is a fragmentary assembled sectional view of FIG. 5A.

Please refer to FIGS. 5A and 5B, which are exploded perspective and assembled sectional views, respectively, showing a fourth embodiment of the manufacturing method according to the present invention. The fourth embodiment of the manufacturing method is generally similar to the first embodiment except that, in the fourth embodiment, the frame 2 further has a receiving space 23 defined thereon for receiving the heat transfer unit 1 therein. The receiving space 23 is extended from the first side 21 towards the second side 22 without penetrating through the frame 2. The receiving space 23 has an inner wall surface 24 perpendicular to the top and the second side 21, 22 of the frame 2. The heat transfer unit 1 is fitted in the receiving space 23, and the heat transfer unit 1 and the frame 2 are spot welded together at a junction formed therebetween, so as to hold the heat transfer unit 1 in the receiving space 23 on the frame 2. The spot welding can be resistance welding, ultrasonic welding, or laser spot welding. It is noted the heat transfer unit 1 is fixedly attached to the frame 2 by spot welding the ineffective portions 12 located at two ends of the heat transfer unit 1 to the frame 2. With the above method, the heat transfer unit 1 is fixedly attached to the frame 2 by spot welding, which not only effectively reduces the steps for assembling the heat transfer unit 1 to the frame 2 and the material and production costs for applying adhesive agent or adhesive tape, but also avoids the problem of assembling tolerance caused by accumulated solder.

Figure 6A:
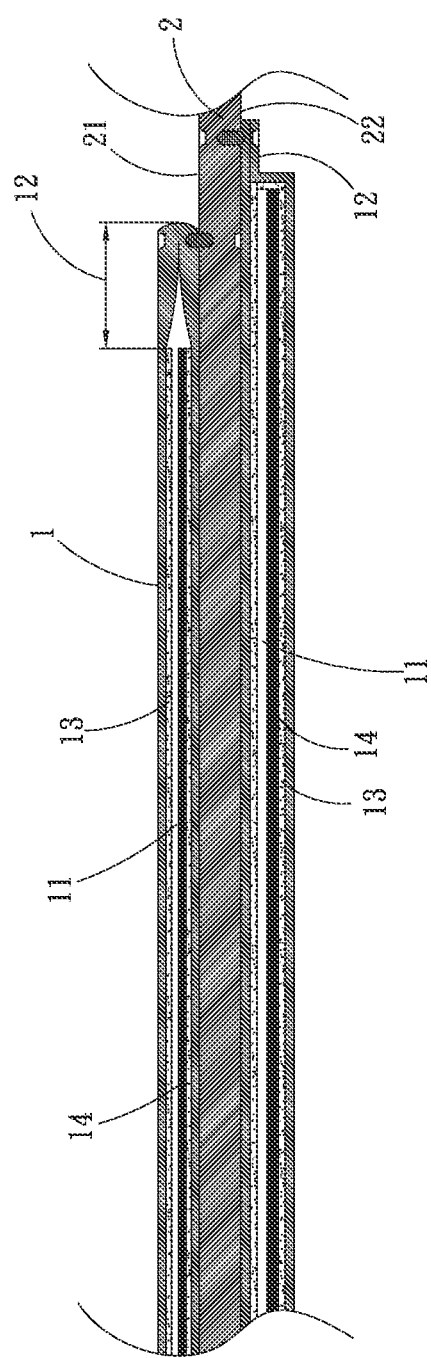
FIG. 6A is a fragmentary assembled sectional view showing a fifth embodiment of the manufacturing method according to the present invention.
Figure 6B:
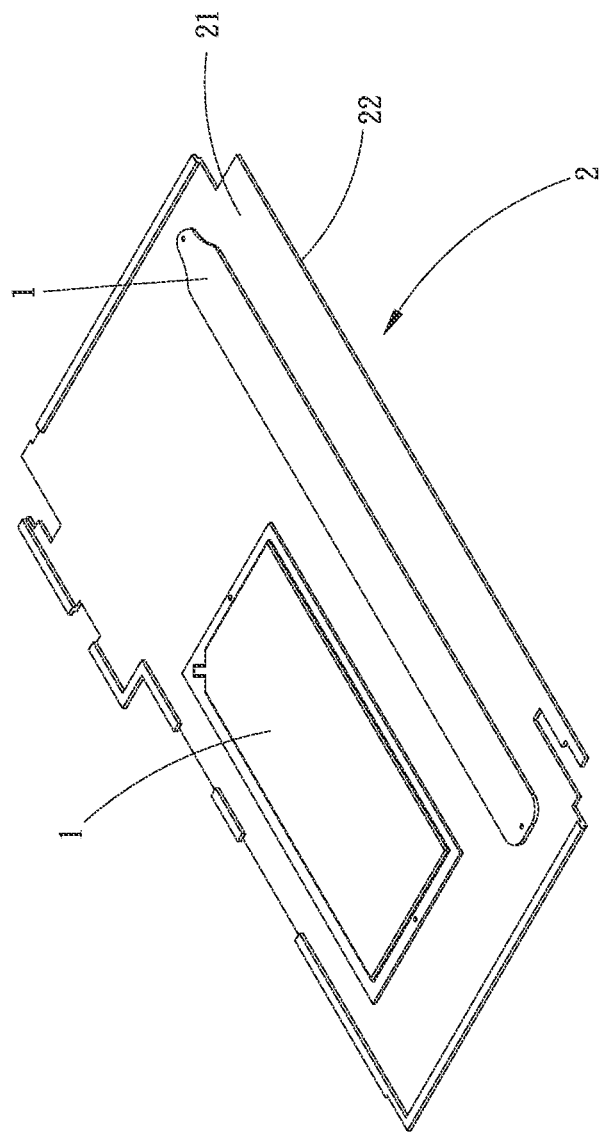
FIG. 6B is an assembled perspective view showing a sixth embodiment of the manufacturing method according to the present invention.

Please refer to FIG. 6A, which is a fragmentary assembled sectional view showing a fifth embodiment of the manufacturing method according to the present invention, and to FIG. 6B, which is an assembled perspective view showing a sixth embodiment of the manufacturing method according to the present invention. The fifth and sixth embodiments of the manufacturing method are generally similar to the first embodiment except that, in the fifth embodiment as shown in FIG. 6A, a heat transfer unit 1 in the form of a flat heat pipe and another heat transfer unit 1 in the form of a plate-type heat pipe are attached to the first side 21 and the second side 22, respectively, and that in the sixth embodiment as shown in FIG. 6B, a heat transfer unit 1 in the form of a flat heat pipe and another heat transfer unit 1 in the form of a plate-type heat pipe are attached to the first side 21 of the frame 2. According to the fifth and sixth embodiments, after the heat transfer unit 1 in the form of a flat heat pipe is first attached to the first side 21 of the frame 2, the flat heat pipe and the first side 21 of the frame 2 are spot welded together at a junction formed therebetween to connect the flat heat pipe to the frame 2. Then, the other heat transfer unit 1 in the form of a plate-type heat pipe is attached to the second side 22 as shown in FIG. 6A or to the first side 21 of the frame 2 as shown in FIG. 6B, and the plate-type heat pipe and the second side 22 or the first side 21 of the frame 2 are spot welded together at a junction formed therebetween to connect the heat transfer unit 1 to the frame 2. The spot welding can be resistance welding, ultrasonic welding, or laser spot welding. It is noted the two heat transfer units 1 are fixedly attached to the frame 2 by spot welding the ineffective portions 12 thereof to the frame 2, so as to effectively reduces the assembling steps and manufacturing costs, as well as avoid the problem of assembling tolerance caused by accumulated solder.

Figure 7:
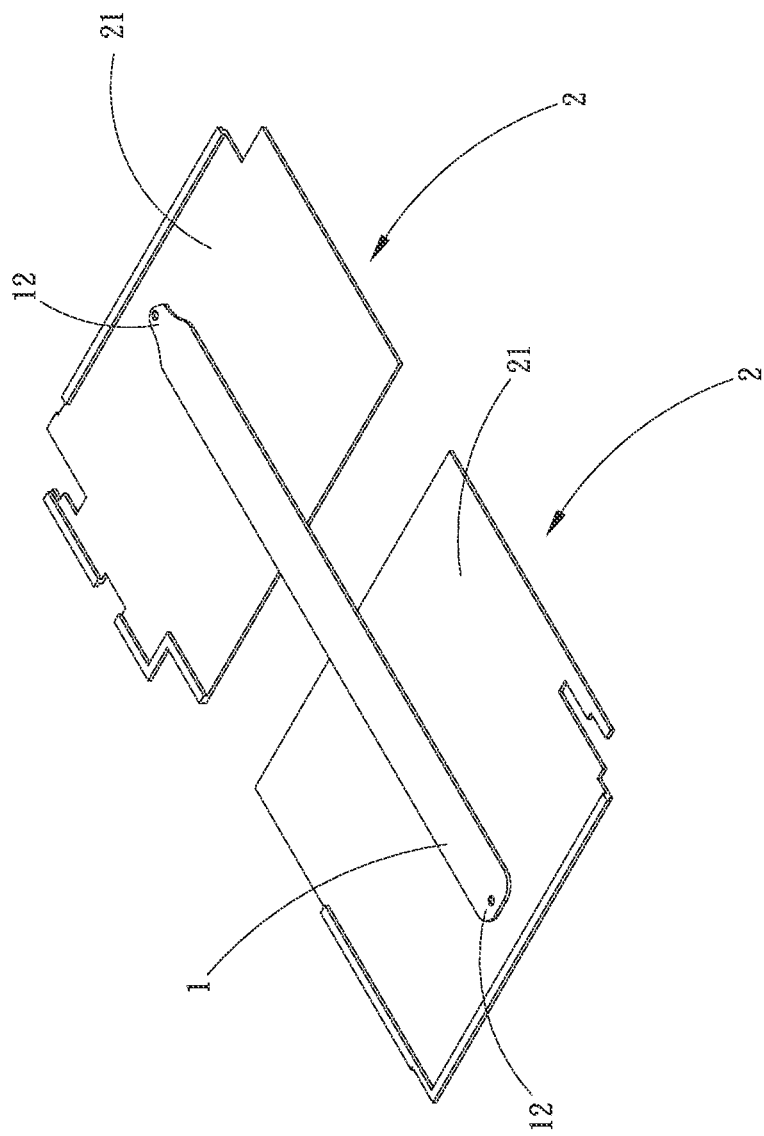
FIG. 7 is an assembled perspective view showing a seventh embodiment of the manufacturing method according to the present invention.

Please refer to FIG. 7, which is an assembled perspective view showing a seventh embodiment of the manufacturing method according to the present invention. The seventh embodiment of the manufacturing method is generally similar to the first preferred embodiment except that, in the seventh embodiment, the heat transfer unit 1 is in the form of a flat heat pipe and attached to two frames 2. The heat transfer unit 1 is attached to the first sides 21 of the two frames 2, and then the heat transfer unit 1 and the first sides 21 of the two frames 2 are spot welded together at junctions formed therebetween to connect the heat transfer unit 1 to the two frames 2. It is noted the heat transfer unit 1 is fixedly attached to the frames 2 by spot welding the ineffective portions 12 thereof to the frames 2. With the above method, the heat transfer unit 1 is fixedly attached to the frames 2 by spot welding, which not only effectively reduces the steps for assembling the heat transfer unit 1 to the frames 2 and the material and production costs for applying adhesive agent or adhesive tape, but also avoids the problem of assembling tolerance caused by accumulated solder.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A method of manufacturing a heat dissipation device, comprising the following steps:
   providing at least one heat transfer unit; the heat transfer unit having at least one ineffective portion formed at an end and the at least one heat transfer unit defining an internal chamber, wherein the chamber includes at least one wick structure and a working fluid, wherein the wick structure does not extend into the at least one ineffective portion;
   providing a frame and attaching the at least one heat transfer unit to the frame in order to form a junction at the at least one ineffective portion between the frame and the heat transfer unit; and
   spot welding the at least one ineffective portion of the heat transfer unit to the frame at the junction formed between the frame and the heat transfer unit, so that the heat transfer unit is fixedly attached to the frame away from the wick structure at only the ineffective portion of the heat transfer unit.

2. The method of manufacturing a heat dissipation device as recited in claim 1, wherein the frame has a first side and an opposite second side; and the heat transfer unit is attached to one of the first side and the second sides of the frame.

3. The method of manufacturing a heat dissipation device as recited in claim 2, wherein the frame further includes a receiving space defined thereon; and the heat transfer unit being fitted in the receiving space before the step of spot welding the heat transfer unit to the frame at a junction formed between the frame and the heat transfer unit, so that the heat transfer unit is fixedly held in the receiving space on the frame.

4. The method of manufacturing a heat dissipation device as recited in claim 2, wherein the frame further has a receiving space defined thereon to extend through the frame from the first side to the second side; and the heat transfer unit being fitted in the receiving space before the step of spot welding the heat transfer unit to the frame at a junction formed between the frame and the heat transfer unit, so that the heat transfer unit is fixedly held in the receiving space on the frame.

5. The method of manufacturing a heat dissipation device as recited in claim 4, wherein the receiving space on the frame has an inner wall surface, which is perpendicular to the top and the second side.

6. The method of manufacturing a heat dissipation device as recited in claim 1, wherein the heat transfer unit is selected from the group consisting of a flat heat pipe, a heat transfer plate, a plate-type heat pipe, and a vapor chamber.

7. The method of manufacturing a heat dissipation device as claimed in claim 1, wherein the frame is made of an electromagnetic interference prevention material.

8. The method of manufacturing a heat dissipation device as claimed in claim 1, wherein the spot welding is selected from the group consisting of resistance welding, ultrasonic welding, and laser spot welding.

* * * * *